No. 695,375. Patented Mar. 11, 1902.
C. E. CHAMBERLAND.
FILTER.
(Application filed Aug. 19, 1901.)
(No Model.)
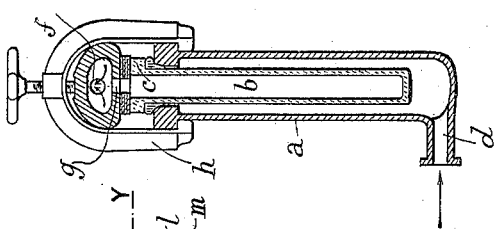
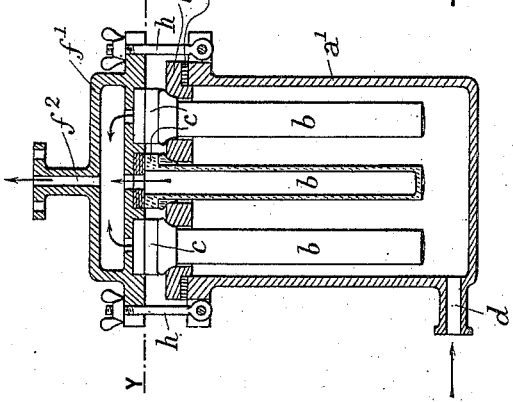
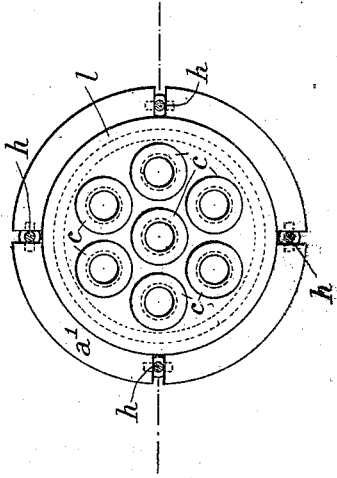
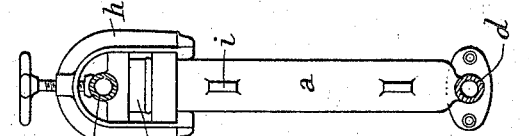
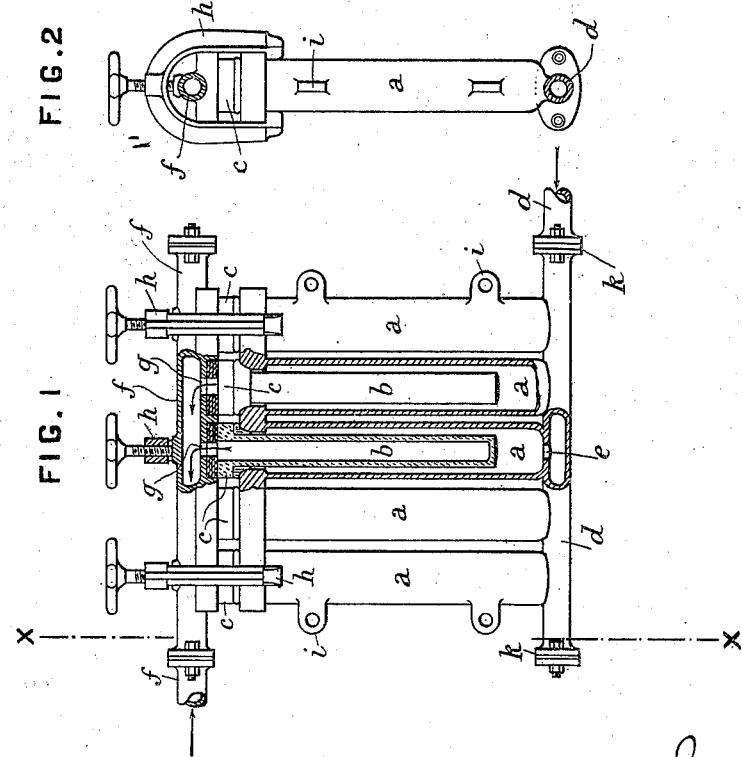
Witnesses:-
Fred W Englert
Percy C Bowen
Inventor:-
C. E. Chamberland
by Dickinson & Fisher
Attys.
THE NORRIS PETERS CO., PHOTO-LITHO., WASHINGTON, D. C.

UNITED STATES PATENT OFFICE.

CHARLES EDOUARD CHAMBERLAND, OF PARIS, FRANCE.

FILTER.

SPECIFICATION forming part of Letters Patent No. 695,375, dated March 11, 1902.

Application filed August 19, 1901. Serial No. 72,561. (No model.)

*To all whom it may concern:*

Be it known that I, CHARLES EDOUARD CHAMBERLAND, a citizen of the Republic of France, residing at Paris, France, have invented a certain new and useful Improvement in Filters, (for which I have secured Letters Patent in France under date of February 1, 1901, No. 307,723;) and I do hereby declare that the following is a full, clear, and exact specification of the same.

The object I have in view is to provide a filter which shall be cheap to manufacture and which shall besides be capable of being readily taken apart and put together again.

The herein-described filter is more particularly designed for water; but it can be utilized with equal advantages for filtering wine and other beverages and all liquids generally.

The filtering medium used in the filter to be herein described may be composed of any approved substance or substances. I prefer, however, to produce it from the substances and in the manner set forth in my prior patents of the United States, numbered 336,385 and 336,386 and dated February 16, 1886. The filtering medium may be cylindrical or of any other approved shape, a number of the filtering-bodies being preferably grouped together, so as to embrace a multiple of filtering elements in one single filtering apparatus. An approved form of filtering-body may resemble the body set forth and illustrated in my prior patent of the United States, numbered 336,089 and dated February 16, 1886, the body filtering either from the outside to the inside, or vice versa.

In the filter herein described the filtering operation takes place from the outside to the inside of the hollow body.

In the accompanying drawings, Figure 1 is a longitudinal sectional elevation of a filter embodying my improvement. Fig. 2 is a vertical section of the same on the line X X of Fig. 1. Fig. 3 is a sectional elevation of a filter embodying my improvement, wherein one single filtering-body is used instead of a plurality of the same. Fig. 4 is a sectional elevation of a filter also embodying my improvement, wherein the filtering-bodies are contained in one vessel common to all. Fig. 5 is a cross-section on the line Y Y of Fig. 4.

Referring to Figs. 1 and 2, $a\ a\ a$ are cylinders each intended to contain a filtering-body $b$ of any approved form. Preference should, however, be given to the well-known Chamberland-Pasteur filtering-body, formed with a collar or flange $c$, unprovided with a nipple, as devised by me and patented in France under date of March 17, 1900, No. 298,311. All the cylinders $a$ are cast in one single piece (cast-iron, copper, or other suitable metal or material) with a pipe $d$, by which the water to be filtered is supplied. The filtering-bodies $b$ are placed in the cylinders $a$ with their flange $c$ bearing upon the top of the same, a proper joint being obtained, as usual, by a suitable packing. The bodies $b$ all connect with a pipe $f$, wherein is gathered the filtered water and whereby the latter is supplied to consumption. The pipe $f$ has as many covers and joints as there are bodies $b$, the joints between the flanges $c$ of the said bodies and the covers being likewise obtained by a suitable packing. An opening $g$, formed opposite each body $b$, connects the inside of the latter with the inside of the collecting-pipe $f$. The collecting-pipe $f$ is fastened to the cylinders $a$, while at the same time producing a water-tight joint by means of a number of screw-stirrups $h$ or their mechanical equivalent, such as a clamping device with a bayonet-joint or the like.

Taken as a whole, the herein-described apparatus may constitute a unit, of which a number may be grouped to form a battery of great capacity, for which purpose the inlet-pipe $d$, which supplies the water to be filtered, is provided at each end with flanges $k$ for connecting the units together. Lugs $i\ i$ may be formed on each unit for fastening the same to a wall or other support.

Referring to Fig. 3, I have shown an arrangement which is similar to the arrangement shown in Figs. 1 and 2, with this difference, that instead of having a number of filtering-bodies the apparatus only contains one. Excepting this difference the arrangement remains the same, the same letters of reference designating the same parts.

Referring to Figs. 4 and 5, I have shown how all the filtering-bodies may be grouped, not singly in a series of cylinders, as shown in Fig. 1, but collectively in a common vessel $a'$, the upper opening $f'$ of which is closed by a perforated plate $l$, through the perforations of which are passed the bodies $b$, so as to bear with their flanges $c$ upon the said plate. Over the said plate $l$ is placed the head $f'$, which connects with the flange $c$ of each body and forms therewith a water-tight joint by means of a suitable packing, as in the case of Figs. 1 and 2. Between the perforated plate $l$ and the vessel $a$ is also interposed a suitable packing $m$, whereby a water-tight joint is obtained. The whole is clamped together by means of bolts, stirrups, or equivalent devices $h$. The water to be filtered enters at $d$, and the filtered water leaves the apparatus through the head $f'$ at $f^2$.

It is obvious that I do not limit myself to a filtering-body having a flange unprovided with a nipple, considering that the said flange might just as well have a nipple, it being simply necessary to modify the form of the cover portion of the apparatus, which is cast in one piece with the water-inlet pipe $d$, Fig. 1.

I claim—

A filter comprising a plurality of cylinders for containing each a filtering-body, formed in one piece with the inlet-pipe for the liquid to be filtered, combined with a cover formed in one piece with the outlet-pipe for the filtered liquid, means for securing liquid-tight joints between the filtering-bodies and the said cylinders on the one hand and the said cover on the other, and means for clamping the said cover, substantially as herein described and shown.

In witness whereof I have hereunto set my hand, this 6th day of August, 1901, in the presence of two subscribing witnesses.

CHARLES EDOUARD CHAMBERLAND.

Witnesses:
  HORACE LEE WASHINGTON,
  L. H. MUNION.